United States Patent [19]

Fukuoka et al.

[11] 4,168,487

[45] Sep. 18, 1979

[54] CODE DETECTION CIRCUIT

[75] Inventors: Kenji Fukuoka, Fussa; Takashi Hamaoka, Hino, both of Japan

[73] Assignee: Olympus Optical Company Limited, Tokyo, Japan

[21] Appl. No.: 847,489

[22] Filed: Nov. 1, 1977

[30] Foreign Application Priority Data

Nov. 5, 1976 [JP] Japan ................................ 51/132291

[51] Int. Cl.$^{2}$ ................................ G06F 11/00

[52] U.S. Cl. ................................ 340/146.1 R

[58] Field of Search .............. 340/146.1 BA, 146.1 R, 340/146.2; 235/308, 306, 302

[56] References Cited

U.S. PATENT DOCUMENTS

| | | | |
|---|---|---|---|
| 3,096,511 | 7/1963 | Taras | 235/302 |
| 3,562,708 | 2/1971 | Verbarg et al. | 340/146.1 R |
| 3,743,819 | 7/1973 | Kapsambelis et al. | 340/146.1 BA |
| 3,781,792 | 12/1973 | Birkin | 340/146.1 BA |
| 3,794,974 | 2/1974 | Henn et al. | 340/146.2 |
| 3,863,215 | 1/1975 | McGrogan, Jr. | 340/146.1 BA |

*Primary Examiner*—Charles E. Atkinson

*Attorney, Agent, or Firm*—Haseltine, Lake & Waters

[57] ABSTRACT

A code detection circuit for removing an influence due to an error code transmitted in a band compression facsimile, etc. The circuit comprises an input register for temporarily memorizing input data, an output register coupled to the output of the input register, a comparison circuit coupled to the input and output of the input register and comparing the input data of the input register with the output thereof, and a reader for reading the output of the input register in the output register by means of the output of the comparison circuit when the input data becomes coincident with the output of the input register.

2 Claims, 3 Drawing Figures

Vcc
R
1
2
3
4
5
6
7
8
9
PR
101 103
102 104
CLR
105
PR
201 203
202
CLR
205

CODE DETECTION CIRCUIT

BACKGROUND OF THE INVENTION

1. Field of the Invention:

This invention relates to a code detection circuit for removing an influence due to an error code transmitted in a band compression facsimile, etc.

2. Description of the Prior Art:

It has heretofore been proposed to detect and remove an error code transmitted in a band compression facsimile, etc. by means of a code detection circuit which makes use of a parity check or cyclic redundancy check code used for a digital circuit of electronic computers, etc. These circuits, however, are very complex in construction and hence are not suitable for widely used data transmission apparatus such as a facsimile, etc.

SUMMARY OF THE INVENTION

An object of the invention, therefore, is to provide a code detection circuit which does not require a conventional complicated circuit which makes use of a parity check or cyclic redundancy check code, which is simple in construction and which can reliably detect and remove an error code and can obtain a correct code.

A feature of the invention is the provision of a code detection circuit comprising an input register for temporarily memorizing input data, an output register coupled to the output of the input register, a comparison circuit coupled to the input and output of the input register and for comparing the input data with the output of the input register, and means for reading the output of the input register in the output register responsive to the output of the comparison circuit when the input data becomes coincident with the output of the input register.

The invention will now be described in greater detail with reference to the accompanying drawings.

DESCRIPTION OF THE PREFERRED EMBODIMENTS

Figure 1:
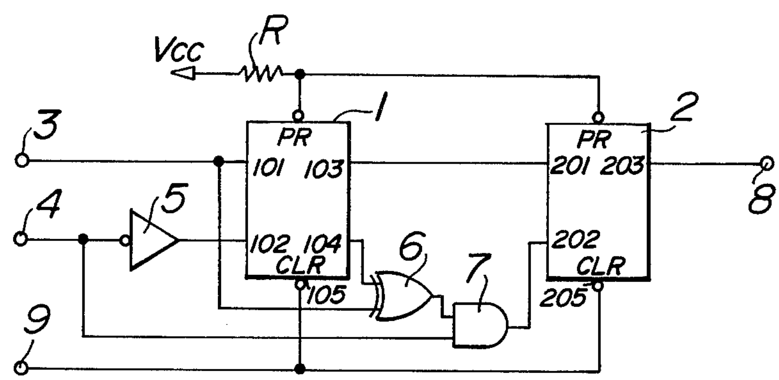
FIG. 1 is a circuit diagram of one embodiment of a code detection circuit according to the present invention.

In FIG. 1 is shown a code detection circuit for 1 bit code input according to the invention. The circuit comprises an input register 1 composed of a flipflop and an output register 2 composed of a flipflop. To a data input terminal 101 of the input register 1 is supplied a code input 3 and to a timing input terminal 102 of the input register 1 is supplied a positive timing input 4 through an inverter 5 which operates to convert the timing input 4 from positive to negative. A positive logic output is supplied from a direct output terminal 103 of the input register 1 to a data input terminal 201 of the output register 2. To both input terminals of a comparison circuit composed of an exclusive logic sum gate i. e. exclusive OR gate 6 are supplied a negative logic output from an inverting output terminal 104 of the input register 1 and from the code input 3, respectively. The exclusive logic sum gate 6 operates to compare the data input of the input register 1 with the inverted output thereof and supply its logic output to one of input terminals of an AND gate 7. To the other input terminal of the AND gate 7 is supplied the timing input 4 and the output of the AND gate 7 is supplied to a clock input terminal 202 of the output register 2. From a positive logic output terminal 203 of the output register 2 is supplied a detection output 8. To both clear input terminals CLR of the input and output registers 1, 2 is supplied a reset input 9. Preset terminals PR of the input and output registers 1, 2 are connected through a register R to an electric supply source Vcc.

The code input 3 is read in the input register 1 by means of the timing input which has been converted by the inverter 5. The comparison circuit composed of the exclusive logic sum gate 6 operates to compare the code input 3 with the code which has temporarily been memorized in the input register 1 and open the AND gate 7 when the code input 3 becomes coincident with the latter code. The output of the AND gate 7 is a clock pulse which operates to read the positive logic output of the input register 1 in the output register 2. As a result, even when the input code 3 is subjected to changes in code consisting of at most 2 timing pulses, such changes in code do not appear in the output register 2.

Figure 2:
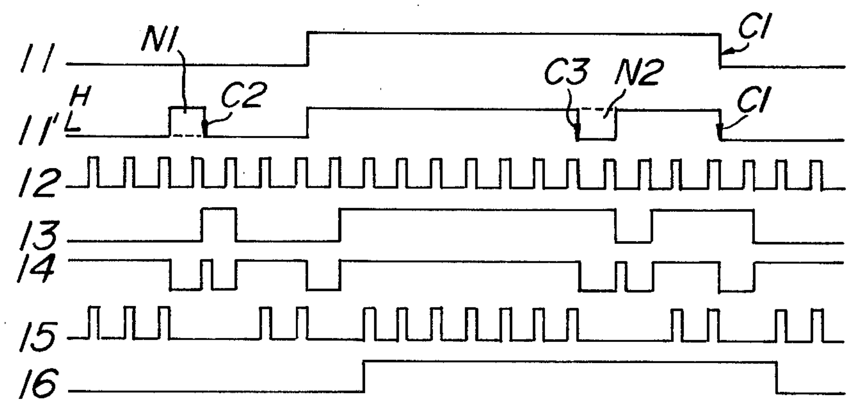
FIG. 2 shows time charts of signals that are used in explaining the operating characteristics in the various portions of the circuit shown in FIG. 1.

In FIG. 2 is shown time charts of signals in the various portions of the circuit shown in FIG. 1. A wave form 11 represents a correct code input 3, a wave form 11' a code input 3 inclusive of error signals, a wave form 12 a timing input 4, a wave form 13 the positive logic output supplied from the output terminal 103 of the input register 1, a wave form 14 the output of the exclusive logic sum gate 6, a wave form 15 the output of the AND gate 7 and a wave form 16 the detected output 8.

The wave form 11 shown in FIG. 2 represents, for example, a signal for controlling a record sheet for a band compression facsimile apparatus. The band compression facsimile apparatus operates to convert a synchornizing signal, record sheet control signal and 1 line picture image signal into corresponding codes, respectively, and transmit one synchronizing code and one record sheet control code every 1 line picture image code.

The record sheet control code received at a receiver is decoded into a record sheet control signal which is used to control a record sheet feeding clutch or control a record sheet cutter. The record sheet feeding clutch becomes engaged, for example, at an H level of the wave form 11 and becomes disengaged at an L level of the wave form 11 and causes the record sheet cutter to operate at a trailing edge $C_1$ of the pulse.

Now, let the wave form 11 be deformed into the wave form 11' inclusive of error signals produced during transmission, portions of the wave form 11' which are designated by $N_1$ and $N_2$ being the error signals.

If such signal 11' is used to control the record sheet, there is a risks of the feeding operation of the record sheet being interrupted at an undesirous instant or the record sheet being cut at trailing edges $C_2$, $C_3$ of the error signals $N_1$, $N_2$, thereby rendering the operation very troublesome.

The timing input wave form 12 is a signal synchronized with the synchronizing signal and is a strobe signal for the code input 11'. The timing input 12 is converted by means of the inverter 5, and as a result, the code input 11' is read in the input register 1 at the trailing edge of the timing input 12. As a result, the positive logic output 13 of the input register 1 can be represented by a signal similar to the input code 11' but lagged in phase therefrom. To the exclusive logic sum gate 6 are supplied the negative logic output of the input register 1, that is, a signal having a wave form inverted from the wave form 13 on the one hand and the code input 11' on the other hand, so that the output of the exclusive logic sum gate 6 is an output delivered when these two inputs coincide with each other and represented by the wave form 14. That is, if the codes at consecutive 2 lines are the same, the logic output of the exclusive logic sum gate 6 becomes "1". The output 14 of the exclusive logic sum gate 6 operates to gate the timing input pulse train 12 at the AND gate 7. As a result, the output 15 of the AND gate 7 becomes a clock pulse in which 1 timing pulse is absent immediately after the change in code in the code input 11'. The output clock pulse 15 of the AND gate 7 operates to read the positive logic output 13 of the input register 1 in the output register 2. As a result, even when changes occur in the code input 11', if such changes do not continue for 2 lines, no changes occur in the output 16 of the output register 2.

As seen from FIG. 2, the output wave form 16 of the output register 2 does not contain the error signals $N_1$ and $N_2$ which have been produced in the code input 11', and is the same in wave form as the correct code input 11, but lagged in phase by 1 line. But, this lag in phase by 1 line is on the order which involves substantially no difficulty.

Figure 3:
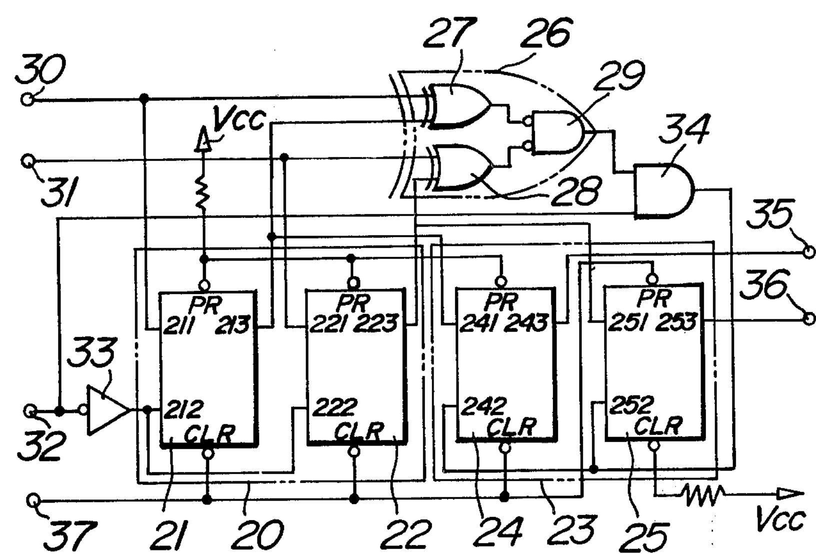
FIG. 3 is a circuit diagram of another embodiment of a code detection circuit according to the present invention.

In FIG. 3 is shown another embodiment of a code detection circuit for 2 bits code input according to the invention.

In a band compression facsimile, for example, in the case of transmitting a signal representing a scanning line density, the 2 bits code may represent scanning line density as shown in the following Table.

Table

| Data | | Scanning line density |
|---|---|---|
| 0 | 0 | — |
| 0 | 1 | 7.7 line/mm |
| 1 | 0 | 3.85 line/mm |
| 1 | 1 | 2.57 line/mm |

The 2 bits code representing the scanning line density shown in the above Table are transmitted several times for every one manuscript prior to the transmission of the manuscript picture signal and received at the receiver so as to record the scanning line density. As a result, in order to obtain a correct picture image, the code representing the scanning line density must precisely be received.

The code detection circuit shown in FIG. 3 is useful for correctly detecting 2 bits code such as the code representing the above described scanning line density.

An input register 20 is composed of two flipflops 21, 22 and an output register 23 is composed of two flipflops 24, 25.

Reference numeral 26 designates a comparison circuit for comparing an input of the input register 20 with an output thereof. The comparison circuit 26 is composed of two exclusive logic sum gate 27, 28 for comparing inputs of the flipflops 21, 22 with outputs thereof, respectively, and a NOR gate 29 for providing a logic sum of the outputs of the gates 27, 28. 2 bit data inputs 30, 31 are supplied to data input terminals 211, 221 of the flipflops 21, 22 of the input register 20, respectively. These data inputs and positive logic outputs 213, 223 of the flipflops 21, 22 are supplied to input terminals of the exclusive logic sum gates 27, 28, respectively. A positive timing pulse input 32 is converted by a converter 33 into negative input and then supplied to clock input terminals 212, 222 of the flipflops 21, 22 so as to read the data inputs 30, 31 in the flipflops 21, 22, respectively. Both the exclusive logic sum gates 27, 28 operate to compare the inputs of the flipflops 21, 22 with the outputs thereof and deliver a negative logic output when the inputs of the flipflops 21, 22 become coincident with the output thereof, respectively.

These negative logic outputs of the exclusive logic sum gates 27, 28 are supplied to a NOR gate 29 which operate to obtain the negative of the logic sum of the negative logic outputs of the gates 27, 28. When the outputs of both the exclusive logic sum gates 27, 28 are negative logic outputs only, the output of the NOR gate 29 becomes a positive logic output for opening an AND gate 34.

To the AND gate 34 are supplied the output of the NOR gate 29 and the timing pulse 32. The output of the NOR gate 29 causes the timing pulse 32 to gate out of the AND gate 34. The output of the AND gate 34 is supplied to clock input terminals 242 and 252 of the flipflops 24 and 25 of the output register 23. The clock inputs operate to read the outputs 213, 223 of the flipflops 21, 22 supplied to the data terminals 241, 251 in the flipflops 24, 25, respectively. The outputs 243 and 253 of the flipflops 24 and 25 becomes detected outputs 35 and 36 of the data inputs 30 and 31, respectively.

As a result, it is possible to detect a correct signal independently of the presence of the error code in 1 line.

In the present embodiment, if the input and output registers 20, 23 are reset by means of a reset input 37, the outputs 35, 36 are reset to the logic outputs "0", "1", respectively. This is because of the fact that as shown in the above Table, the 2 bit code of "0", "0" does not represent the scanning line density.

The invention is not limited to the above described embodiments and various changes, modifications and alterations may be made. For example, the above described embodiments are described as a code detection circuit for 1 bit and 2 bit codes, respectively, but provision may be made for a code detection circuit for more than 2 bit codes.

In addition, the code detection circuit according to the invention may be applied not only to the band compression facsimile but also to any other data transmission apparatus.

As stated hereinbefore, the invention is capable of removing the influence due to error in code by an extremely simple circuit construction, of correctly transmitting and detecting a control code for controlling a record sheet feed clutch, record sheet cutter, scanning line density, etc. of a band compression facsimile and of normally operating a receiver.

What is claimed is:

1. A code detection circuit for 2 bit input comprising an input register composed of two flipflops and temporarily memorizing two bit input data, said two flipflops having input terminals connected to two respective inputs of the input register, an output register composed of two flipflops having input terminals connected to respective output terminals of said flipflops of said input register, a comparison circuit composed of two exclusive logic sum gates and a NOR gate coupled to said exclusive logic sum gates, said exclusive logic sum gates having input terminals coupled to said two inputs and coupled to respective negative logic outputs of said flipflops of said input register, and means composed of an AND gate having inputs coupled to the output of said NOR gate and coupled to a timing input for reading said output of said input register into said output register responsive to the output of said comparison circuit when said input data becomes coincident with the output of said input register.

2. A code detection circuit for a one-bit input comprising: a timing means for emitting timing pulses; input register means for temporarily storing a one-bit input, said input register means having a data input for receiving one-bit of data, a timing input for timing when said input register means accepts the one-bit of data at its data input, a direct output for transmitting a signal representing the contents of said input registor means and an inverting output for transmitting a signal representing the inverse of the contents of said register means; an output register means having a data input for receiving one-bit of data, a timing input for timing when said register means accepts the one-bit at its data input, and a direct output for transmitting a signal representing the contents of said output register means; means connecting the direct output of said input register means to the data input of said output register means; a comparison means comprising an exclusive-OR circuit having first and second inputs and an output; means connecting the first input of said exclusive-OR circuit to the data input of said input register means; means connecting the second input of said exclusive-OR circuit to the inverting output; and means connecting the output of said exclusive-OR circuit means to the timing input of said output register means, the latter said means being connected to said timing means and responsive to timing pulses from said timing means whereby data is received by said output register means from said input register means in accordance with the data stored in said input register means and the data received by said input register means.

* * * * *